Nov. 8, 1932.　　　　A. TANALIAS　　　　1,887,109
NAIL ALIGNING DEVICE
Filed Aug. 13, 1931
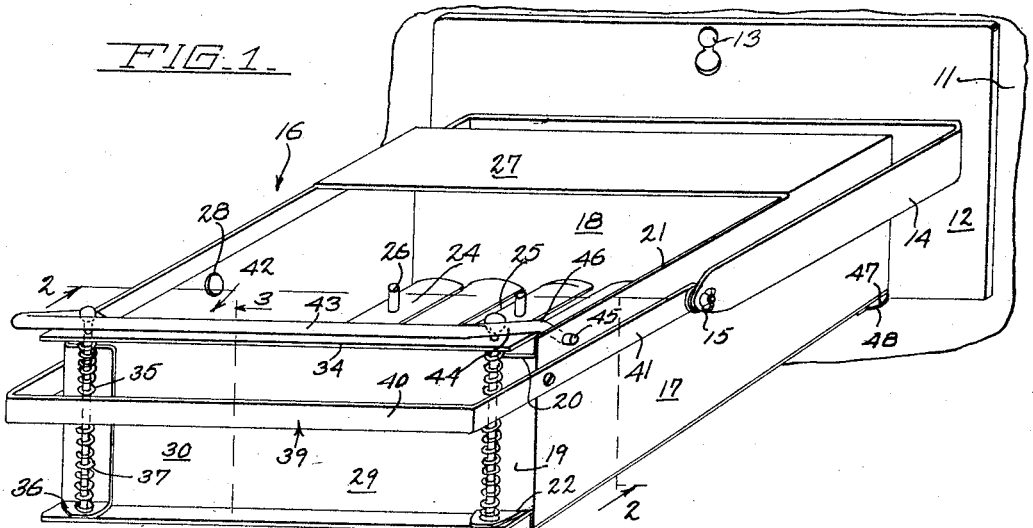
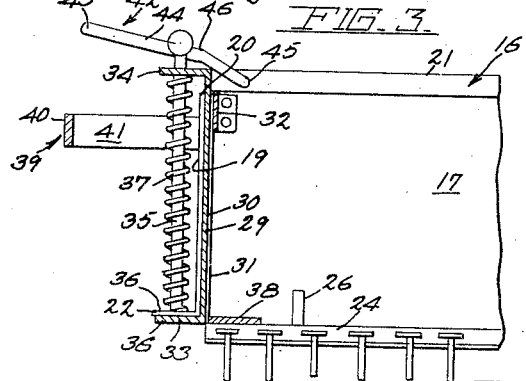
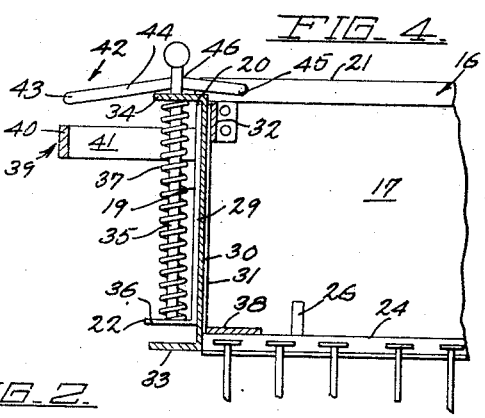
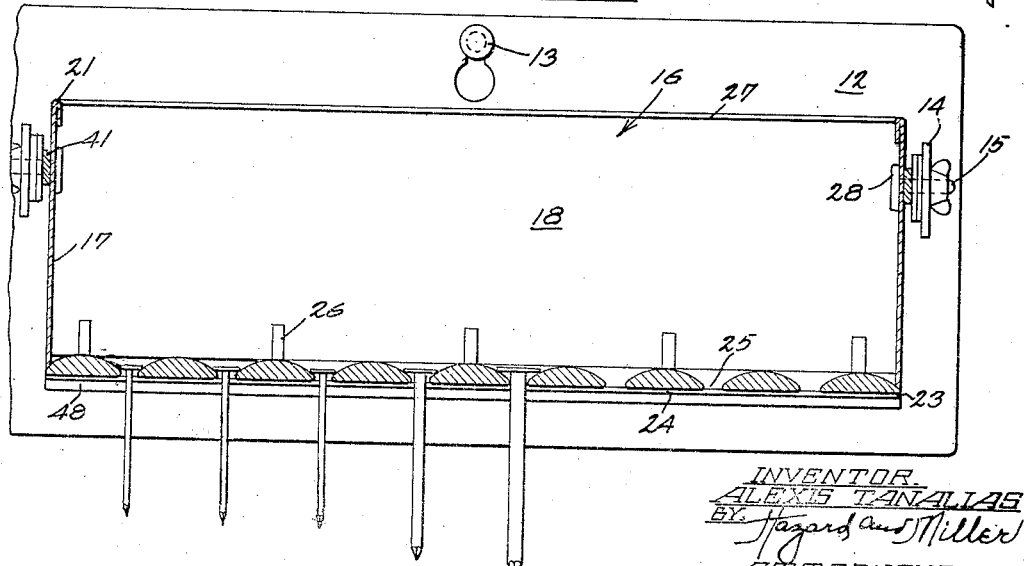
INVENTOR.
ALEXIS TANALIAS
BY Hazard and Miller
ATTORNEYS.

Patented Nov. 8, 1932

1,887,109

UNITED STATES PATENT OFFICE

ALEXIS TANALIAS, OF LOS ANGELES, CALIFORNIA

NAIL ALIGNING DEVICE

Application filed August 13, 1931. Serial No. 556,808.

My invention relates to a nail aligning device of a type which aligns nails in rows suspended by their heads so that the nails may be readily extracted and be all in the same position for quick usage.

An object and feature of my invention is the employment of a nail shifting device in which nails may be shaken and shifted in various directions and eventually the points and the shanks will slip through slots, the heads being larger than the slots to prevent full passage of the nails and thereby suspend the nails with the points and shanks downwardly. In this type of device my invention comprehends removing the nails by sliding these longitudinally of the slots and removing one or more nails at a time from the end of the various slots.

Another object and feature of my invention is the construction of a simple and compact device which may be mounted on a wall and contains a pivotally mounted nail shifting box, this box having a transverse axis on which it may be partly rotated to shift the nails, such box, preferably, being open at the top with a partial closure for this top and having a slotted bottom and a sliding gate at one side to form a closure for the ends of the slots. When nails are inserted in the box through the open top and the box is agitated by swinging on its axis, the nails are tossed in various directions, causing the points and the shanks of a large number of nails to drop through the slots; the heads being too large to pass through the slots, are retained by the bottom of the box. In this connection another feature of my invention relates to a slidable gate forming a side wall and also a closure for the ends of the slots, this gate being operated on by an auxiliary handle cooperating with the main handle of the box so that when the box is agitated the gate will be closed and the nails cannot escape, but when the gate is open the nails may be readily withdrawn. The box is arranged to balance so that the bottom of the box will be substantially horizontal when a sufficient number of nails are suspended through the slots of the bottom.

My invention is illustrated in connection with the accompanying drawing, in which:

Fig. 1 is a perspective view of the nail sifting box and its mounting;

Fig. 2 is a vertical transverse section on the line 2—2 of Fig. 1, taken in the direction of the arrows;

Fig. 3 is a detail transverse longitudinal section on the line 3—3 of Fig. 1 showing the gate in its open position;

Fig. 4 is a view similar to Fig. 1 showing the gate in its closed position.

In the drawing, 11 indicates a wall to which is attached a wall plate 12 by means of a suspending pin 13. Attached to this wall plate there are a pair of arms 14 extending on opposite sides. Each arm supports at its outer end an axle bolt 15, the axle bolt preferably having a thumb nut at the end to allow a looser type of clamping of the box hereinunder detailed.

A nail containing box 16 is provided with opposite sides 17, and a back end 18. Flanges 19 are provided on the front at each side and these flanges may be formed by angles on the front corners or by extending the sides 17 partly around the front. The top edge 20 of this flange, however, is below the top 21 of the sides 17 and the bottom edge 22 of the flange is above the bottom 23 of the sides 17. The bottom of the box is formed of a plurality of slats 24, these being rounded on the top and preferably having a flat bottom, leaving slots 25 between the slats. Certain of these slats have baffle pins 26 extending thereabove. A partial cover 27 is secured to the rear portion of the sides 17 and to the back end 18, thereby forming a partial closure for the top of the box.

The axle bolts 15 extend through the sides 17 and have heads 28 thereon on the inside. These allow tilting of the box and partial rotation of the box on the axis of these bolts. A sliding gate 29 is mounted on the front of the box. This gate is formed with a web section 30 which is guided at its ends between the flange 19 in the front and a guide flange 31 secured to the inside of the sides 17. There is also a crossbar 32 which forms a support and partial guide for the web of the gate. The gate has a horizontal flange 33 at the bottom and 34 at the top.

A pin 35 is secured to a flange 36 which extends outwardly from the lower portion of each of the vertical side flanges 19, this, therefore, being above the bottom of the box. The pin extends upwardly through perforations in the upper flange 34 and has a coiled spring 37 thereon bearing on the fixed flange 36 at the bottom and on the upper flange 34 of the movable gate 29. To give strength to the device, a transverse strap 38 is secured to the opposite sides and to each of the slats, there being a sufficient space underneath the slats and the suspension portion of the curved slats with nails through the slots that there is a passage for the heads of the nails underneath this strap. The tension of the spring thereby tends to elevate the gate 29, holding the lower flange 33 normally in alignment with the strap 38 and allowing free withdrawal of the nails.

The box is provided with a fixed handle 39 which is illustrated as having an end hand grip strap 40 and side straps 41 secured to the sides of the box. A pivoted handle 42 comprises a hand grip portion 43 parallel to the portion 40 of the handle 39 and it has two side arms 44 with outwardly turned ends 45, which ends are pivoted in the sides 17. The arms have a slight bend as indicated at 46 where such arms pass over the upper flange 34 on the gate. As above mentioned, normally these springs maintain the gate opened and when it is desired to agitate the nails in the box the handle 39 is grasped as well as the pivoted handle 42. When these are pressed together the gate is closed and the box may be agitated by tilting on its pivot until a large number of nails have their ends and a portion of the shank extending through the slots, the heads of the nails being retained by the slats 24. After agitating the nails, the box may be brought into a position with its bottom horizontal or else slightly tipped up at the front, and when the gate is released it moves upwardly, allowing the nails to be withdrawn from the ends of the slots, the heads passing underneath the flange 33.

My device is made with the slots of sufficient size to hold and retain nails of materially different sizes. It is not intended, however, that nails of different sizes be mixed in the box at the same time but that nails of a uniform size, such as required in hand box making, be utilized. Therefore, when the nails are sifted in the box the workmen may grasp a handful of nails all lying in the same position, that is, their being in rows. However, it will be appreciated that if mixed sizes of nails are used, if a workman wants a certain size of nails, on account of the large number of slots, chances are that the particular size wanted will be adjacent the exposed end of one of the slots.

In order that the nails cannot slip out of the back of the slots, a bar 47 is attached to the bottom of the slats, and an end portion 48 of the back 18 is carried down over the ends of the slots and attached to this bar. The bar also forms the rear end of the slots.

Various changes may be made in the details of construction without departing from the spirit or scope of the invention as defined by the appended claims.

I claim:

1. A nail aligning device comprising a box structure pivotally mounted and having a plurality of slots along the bottom, such slots being open at one end, a handle to oscillate said box, a closure for said open ends of the slots, an auxiliary handle to operate said closure, and means to open the closure on release of the auxiliary handle, the agitation of the box being adapted to cause the points and shanks of the nails to extend downwardly through the slots.

2. A nail aligning device as claimed in claim 1, the main and the auxiliary handles being positioned to be grasped in one hand in the agitation of the box, and spring means to open said closure on release of the auxiliary handle.

3. A nail aligning device comprising a box structure, a pivotal mounting on opposite sides of said structure, a main handle connected to the box, said box at the bottom having a plurality of parallel slots open at one end, a slidable closure mounted at the end of the box having the open slots, means to retain said closure normally open, and an auxiliary handle connected to the box and operatively connected to said closure to close same during agitation of the box, said main and auxiliary handles being in spaced relation so as to be grasped in one hand during the agitation of the box.

4. A nail aligning device comprising a box having a bottom with slots, a pivotal mounting connected to its opposite sides, said box having an open end at the ends of the slots, a slidable gate forming a closure for the ends of the slots, a handle structure pivotally connected to a part of the box and bearing on the upper edge of said gate, means normally holding the gate open, said gate being closed on operation of said handle, and means cooperating with said handle for agitating the box when said gate is closed by grasping the handle and said latter means and manually agitating the box.

5. A nail aligning device comprising a box having opposite sides, a closed end with a plurality of parallel slots in the bottom, the box having an open end at one end of said slots, a slidable gate at such end forming a closure for the slots, spring means interconnected to the body of the box and to said closure normally retaining said closure open, an auxiliary handle pivotally connected to the sides of the box and bearing on the upper edge of the gate, and means cooperative with said auxiliary handle for agitating the box when the gate is closed and thereby align the nails in the slots by grasping the handle and said latter means and manually agitating the box.

6. A nail aligning device comprising a box having opposite sides, an end closure, and a plurality of parallel longitudinal slots, said box being open at one end and having guide means at said end, a closure gate slidable in the guide means, a main handle connected to the box, an auxiliary handle having its ends pivotally connected to the sides of the box and having side arms bearing on top of the gate, and spring means connected to a fixed part of the box and to the gate to normally hold the gate open, the auxiliary handle being adapted to move toward the main handle to close said gate, said handles being in spaced relation for agitation of the box by grasping the main and the auxiliary handle and manually agitating the box.

7. A nail aligning device comprising a box having opposite sides, a closed end with a partial closure of the top adjacent such end, a pair of supporting arms having means for attachment to a wall, such arms being pivotally connected to the sides of the box, the box being open at one end and having guide means at such end, a plurality of slats spaced apart in the bottom of the box and having slots therebetween, a slidable gate mounted in the guides, spring means connected to a fixed part of the box and to said gate normally holding the gate in the open position and the ends of the slots exposed, a main handle connected to the box and extending across said gate from side to side, an auxiliary handle having side arms pivotally connected to the sides of the box, said arms bearing on the upper part of said gate, the auxiliary handle having a portion parallel to the portion of the main handle across the gate and in spaced relation thereto to permit grasping both handles at the same time for agitating the box, the nails on agitation becoming suspended by their heads with the points and shanks through the slots.

8. A nail aligning device as claimed in claim 7, the slats having agitating pins thereon to engage the nails in the pivoting of the box.

9. A nail aligning device comprising, in combination, a pair of horizontal supporting arms having means for attachment to a wall, a box having vertical sides, a closure end with a partial closure over the top and pivotally connected to the ends of said arms at the sides, said box being open at one end and having a corner guide formed by flanges extending partly across such end, a plurality of slats in the bottom spaced apart forming longitudinal slots, said slats being curved on the upper surface, the slots being open at the open end of the box, an outwardly extending flange from said end, a gate having its sides slidably mounted in said guides and having an upper flange, pins connected to said projecting flange and extending through the flange of the gate with the compression spring wound on each pin and engaging between the projecting flange and the flange of the gate, a main arm connected to the sides and extending across the gate from side to side, an auxiliary arm having a hand grip portion parallel to the hand grip portion of the main handle, the auxiliary handles having side arms extending over the top of the gate and engaging the top and having ends pivotally connected to the sides of the base, said handles on pulling together by a grip of the hand being adapted to move the gate to form a closure for the slots and to permit agitation of the box by manual agitation.

In testimony whereof I have signed my name to this specification.

ALEXIS TANALIAS.